July 15, 1941.  M. E. HANSEN  2,249,205
METHOD AND APPARATUS FOR APPLYING TEMPORARY
PROTECTIVE COATINGS TO ARTICLES
Filed May 12, 1934
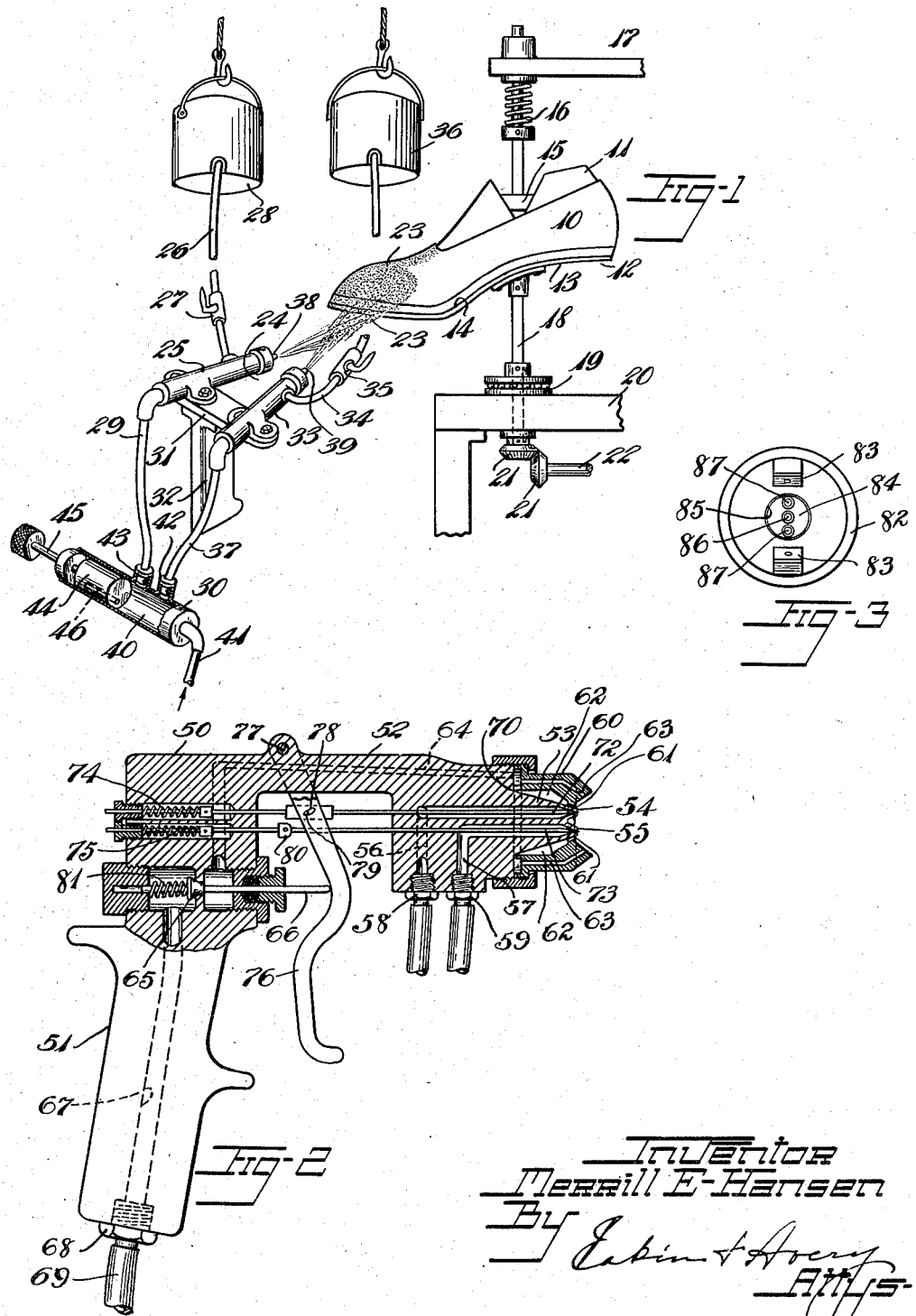
Inventor
Merrill E. Hansen
By Eskin & Avery
Attys.

Patented July 15, 1941

2,249,205

UNITED STATES PATENT OFFICE 2,249,205

METHOD AND APPARATUS FOR APPLYING TEMPORARY PROTECTIVE COATINGS TO ARTICLES

Merrill E. Hansen, Akron, Ohio, assignor to American Anode, Inc., Akron, Ohio, a corporation of Delaware Application May 12, 1934, Serial No. 725,306

11 Claims. (Cl. 91—45)

This invention relates to a method and apparatus for applying temporary protective coatings to articles or parts of articles formed of metal, wood, fabric, and the like, and especially to polished metal surfaces such as chrome-plated, nickel-plated and other bright metal surfaces, and to upholstery, shoes, or other articles formed in whole or in part of material likely to be soiled, scuffed or otherwise damaged during manufacture and storage, and to other articles where a temporary protective coating is of value.

It has heretofore been proposed to coat articles with liquid rubber latex and to dry the latex to form protective coatings upon the articles, but this proposed method has been limited in its application to the coating of articles which are not damaged by contact with the aqueous vehicle of the latex and which have surfaces to which the dried latex does not adhere so tenaciously as to render stripping of the coating unduly difficult or impossible, or to result in damage to the article by reason of disturbance of its surface characteristics by the stripping operation. For example, in the manufacture of certain types of women's shoes which include uppers formed of expensive textile fabrics, it is essential that the uppers be carefully protected to prevent their becoming soiled or otherwise damaged during manufacture of the shoe. Ordinary latex protective coatings applied according to methods heretofore known are not satisfactory for protecting such shoe uppers because the fabric of the uppers frequently is spotted by the aqueous vehicle of the latex and furthermore the dried latex rubber film adheres to the fabric so tenaciously that stripping of the coating is prohibitively difficult, and also because when the coating is stripped the arrangement of the surface fibers is disturbed to such a degree as to impair the appearance of the shoe and accordingly materially to reduce the value thereof. Similar difficulties have been encountered when latex coatings were applied to other articles having easily damaged surfaces.

It is accordingly an object of this invention to provide economic means for applying adherent but readily removable temporary protective coatings to articles having surfaces which are easily damaged, and especially to polished metal and fibrous surfaces, without damaging such surfaces either upon application of the protective coatings or upon subsequent removal thereof. It is a further object of the invention to provide means for protecting easily damaged shoes and parts thereof during manufacture and storage. It is also an object of the invention to provide means for applying a coating of a coagulable aqueous dispersion of rubber or similar material, such as rubber latex, to a normally penetrable fibrous article without substantial penetration of the article by the dispersion and without the usual consequent tenacious adhesion to the fabric of the dried coating. Another object of the invention is to provide novel apparatus for applying latex rubber coatings to articles, and also to provide novel apparatus for simultaneously spraying and intimately mixing two or more fluids.

These and other objects of the invention are attained, in general, by applying to the article to be coated, a coagulable aqueous dispersion of rubber or similar material, which for convenience will be referred to hereinafter simply as "latex," in finely divided form and in at least a partially coagulated condition, to produce upon the article an adherent but non-penetrating and strictly superficial coating of latex rubber or like material which does not in any way damage the surface of the coated article. More specifically, the latex coating is applied by spraying liquid latex toward the article and treating the latex with coagulant before it has reached the surface of the article. In a preferred embodiment, this is accomplished by producing in front of the article to be coated a cloud composed of fluid coagulant in finely dispersed form, and then spraying the latex through the cloud and onto the article, so that the sprayed latex globules are intimately mixed and uniformly treated with coagulant before they reach or are deposited upon the surface of the article being coated. As will hereinafter appear, it is highly essential that no latex be applied to the article unless the latex has first been treated with coagulant, and the invention accordingly includes means designed to insure application only of latex which has first been mixed and treated with coagulant.

To clarify details of the invention and to indicate a preferred mode of performing the same, the application of a temporary protective coating to a partially built shoe and a preferred apparatus for applying the coating will now be described, reference being had to the accompanying drawing of which, Fig. 1 is a perspective view showing a portion of a shoe mounted for application of a protective coating, and also showing in diagrammatic form apparatus for applying the protective coating according to the present invention, the apparatus being shown in operation;

Fig. 2 is a sectional elevation showing a refined apparatus, namely a spray gun, embodying the principles of this invention and being especially adapted for applying latex coatings to articles; and Fig. 3 is an elevation of a modified spray head for use on a spray gun similar to that of Fig. 2.

In a specific example of the invention, a portion of a woman's shoe such as the upper 10 is formed of relatively expensive and easily damaged fabric such as satin, and the upper is lasted upon a conventional last 11 as is usual in shoe manufacture. The last then is mounted for application to the upper of a protective covering, preferably by placing the last upon a sole-protecting shield 12 consisting of a sheet metal base 13 and a superposed layer of resilient material, preferably sponge rubber 14, shaped to conform to the sole of the last and to cover and prevent application of latex to portions of the upper material turned under the last, to which the shoe sole is later to be adhered. The last preferably is held in place and is urged against the resilient shield as by means of a plunger 15 resiliently urged against the top of the last by a coil spring 16, the plunger being slidably mounted upon a suitable support 17. The shield 12 may if desired be secured to the end of a vertical shaft 18 mounted for rotation upon a thrust bearing 19 carried by a frame 20, and the shaft may be rotated through miter gears 21, 21 and a drive shaft 22 driven by a suitable source of power (not shown). Thus, it is seen that a lasted shoe upper mounted upon the shield 12 may be held securely in place and meanwhile rotated in a horizontal plane for application of a protective coating to the upper. In an alternative apparatus, a number of similar shields may be mounted upon a traveling conveyor to carry lasted uppers or shoes past apparatus for applying protective coatings.

After the lasted upper is mounted as described, latex 23 in at least a partially coagulated condition is applied to the upper as by means of spraying apparatus 24 hereinafter more fully described, and the application of the latex is continued until a coating thereof is formed completely covering the exposed surface of the upper, after which the latex is dried to produce an adherent but easily removable protective coating. Manufacture of the shoe then is continued in the usual manner until its completion, when the protective coating may be stripped from the shoe with ease to expose the satin upper in an undamaged and perfectly clean condition. Alternatively, the coating may be allowed to remain upon the finished shoe to protect it from damage during storage.

It has been found that if latex applied to the fabric composing the upper has been at least partially coagulated as hereinabove described, it does not penetrate the fabric to any substantial extent but forms a superficial coating which is sufficiently adherent to maintain its place during subsequent manufacture of the shoe, but which does not adhere with such tenacity as to damage the surface of the fabric when it is stripped therefrom nor to render the stripping unduly difficult. Nor is the most sensitive fabric spotted, discolored, or otherwise damaged by such application of partially coagulated latex as is often the case when uncoagulated latex is applied directly to the fabric and dried thereon. It is highly desirable, therefore, to apply only latex which has been at least partially coagulated and to avoid application to the fabric or other easily damaged surface of the slightest amount of latex which has not been treated with coagulant. This is accomplished by providing means for producing a cloud of coagulant before the article to be coated, and then spraying latex through the cloud and onto the article, and by providing controlling means so designed as to make spraying of the latex impossible except after and while the cloud producing means is in operation.

Such apparatus indicated generally by the numeral 24 comprises for example a compressed air operated latex spray gun 25, having a connecting hose 26, fitted with a valve 27, leading to a reservoir 28 for liquid latex, and also having a compressed air connection 29 leading to a controlling piston valve 30 hereinafter more fully described, and thence to a supply of compressed air (not shown). The latex spray gun 25 is mounted upon a bracket 31 having a handle 32 and upon the bracket is also mounted a second compressed air operated spray gun 33 connected by means of a hose 34, fitted with a valve 35, to a reservoir 36 containing a fluid coagulant, the gun 33 also having an air connection 37 leading to the valve 30 and thence to the supply of compressed air. The two spray guns are mounted upon the bracket 31 at such an angle to each other that fluid streams of latex and of coagulant issuing from their respective spray jets 38 and 39 will converge at a point preferably a few inches from the jets. The valve 30 is designed to permit air to flow to the coagulant spray before it flows to the latex spray and to stop air flow to the latex spray before it is stopped flowing to the coagulant spray and accordingly to insure that the coagulant or cloud producing spray gun always shall be operative before and throughout the time the latex spray is operative. For purposes of illustration the valve 30 has been shown as comprising a tubular fluid tight cylinder 40 connected at one end by means of a tube 41 to a supply of compressed air. The cylinder is provided with a pair of valve ports 42, 43 longitudinally spaced apart along the cylinder wall, the port 42 nearest the air inlet being connected to the coagulant spray gun by the hose 37 while the second port 43 further removed from the air inlet is connected by the hose 29 to the latex spray gun. A piston 44 mounted upon a piston rod 45 and adapted to slide within the cylinder is provided for controlling flow of air through the valve. The piston 44 is provided with a longitudinal channel 46 to equalize the pressure on the two sides of the piston for the purpose of permitting its easy movement within the valve cylinder, and the length of the piston is such that when it is in the closed position (at the air inlet end of the cylinder) both valve ports 42 and 43 are closed so that no air flows to either of the two spray guns. As the piston is moved away from the closed position, air is first admitted to the coagulant spray gun 33 thereby producing a spray or cloud of coagulant before the spray guns (the valve 35 controlling the flow of fluid coagulant to the gun having been opened in the meantime) and thereafter, air is admitted to the latex spray gun 25 which projects liquid latex (the valve 27 also having been opened) through the coagulant cloud and onto the shoe upper. When the piston 44 is returned to the closed position after the coating has been applied to the shoe, the air supply is first cut off from the latex spray and then from the coagulant spray, again positively preventing the application of latex not treated with coagulant. The spraying apparatus has been shown in diagrammatic form for simplicity of illustration and ease of description, and it is apparent that more compact and convenient apparatus embodying the essential features of the present invention as hereinabove indicated may be devised by a skilled artisan.

One example of such refined spraying apparatus is illustrated in Fig. 2 and comprises a spray gun 50 resembling in its general construction spray guns now available commercially, but embodying additional novel features which adapt the gun for use in the present method of applying temporary protective coatings. The gun 50 comprises a cast metal frame consisting of a handle 51 and a "barrel" portion 52 extending from one end of the handle and generally at right angles thereto as in well known types of spray guns. At the end of the barrel portion is provided a frusto-conical projection 53 in the center of which in close mutual relationship are two fluid jets 54, 55, which communicate by means of separate fluid channels 56, 57, with external connections 58, 59, which may lead to fluid reservoirs (not shown) as for example reservoirs containing respectively, fluid coagulant and liquid latex, or other fluids which are to be sprayed together. A removable, cylindrical cap 60 is fitted over the projection 53 in such manner as to provide a restricted annular opening 61 about the end of the frusto-conical projection 53 and the jets 54, 55, which opening communicates with the annular chamber 62 between the projection and the cap. The cap 60 is provided with two angularly directed air jets 63, 63, adapted to produce a fan type spray, which communicate with a passage 64 leading through the gun frame to a valve 65 located in the handle of the gun and operated by movement of a valve stem 66. From the valve 65 a passage 67 leads to an external connection 68, to which a compressed air line 69 may be connected. The annular chamber 62 communicates at the point 70 with the aforesaid air passage 64 to supply air to the annular opening 61 about the two fluid jets 54, 55, when air is flowing through the gun to the air jets 63, 63. The two fluid jets 54 and 55 normally are closed by a pair of needle valves 72, 73 which extend back through the gun frame and which are resiliently urged against the jet valve seat by means of coil springs 74, 75. For operating the air valve 65 and the two needle valves 72, 73 in desired succession, a trigger lever 76 is pivoted at a point 77 upon the gun frame so that the lever in its normal position rests against the end of the valve stem 66 when the air valve 65 is closed. The lever 76 is provided with a slot 78 which engages a pin 79 upon the stem of the needle valve 72 in such manner as to move the valve stem and to open the jet 54 after the trigger lever has been depressed a short distance sufficient to open the air valve 65 and to allow air to flow through the gun. As the trigger lever 76 is further depressed, it engages a block 80 mounted upon the stem of the second needle valve 73 and so opens the jet 55 to permit fluid to issue therefrom. Thus, it is seen that as the trigger lever 76 is depressed the three valves 65, 72, and 73 are opened in succession and likewise as the lever is returned to its normal position by resilient pressure applied by the coil spring 81 about the valve stem 66, the three valves are closed in reversed succession.

A slightly modified form of spray head, illustrated in Fig. 3, may be used upon a gun similar to the one hereinabove described, to secure exceptionally intimate mixing of the latex and the coagulant. Such a spray head comprises the usual cylindrical cap 82, adapted to be clamped or screwed onto the end of a spray gun, and having two angularly directed air jets 83, 83 disposed at diametrically opposed points upon the cap, the jets being so directed that air streams issuing therefrom will converge at a point in front of the gun. The cap likewise has a central circular opening which is slightly larger than a projecting nose 84 of the gun about which the opening fits to provide a restricted annular outlet 85 from which air may issue. In the center of the projection 84 is provided a latex jet 86, and in closely relationed positions thereto, a pair of coagulant jets 87, 87, located one on each side of the latex jet and in a line with the air jets 83, 83. In using such a spray head, the latex stream issuing from the central jet is surrounded by the two coagulant streams and the latex and coagulant are intimately admixed and broken into a directed fan spray by the air streams issuing from the annular outlet and the two angularly directed jets. Other arrangements of the various fluid jets obviously are possible.

Constructional details of the spray gun and head have been omitted for clarity of illustration but may be supplied by one familiar with such equipment.

In using the spray gun 50 for applying temporary protective coatings according to the present invention, fluid coagulant is supplied by means of the connection 58 to the jet 54 and latex likewise is supplied through the connection 59 to the jet 55, both liquids being supplied under slight pressure as by gravity feeding. Compressed air at a pressure of 20 to 50 pounds per square inch is supplied by means of the connection 68. The spray head of the gun is brought to a point about four to six inches removed from the surface to be coated and the trigger lever 76 is depressed, opening the three valves in succession as described and thereby causing air to issue first from the jets 63, 63 and from the annular opening 61, followed almost immediately by fluid coagulant from the jet 54 to produce a coagulant cloud between the gun and the article, and later followed by latex issuing from the jet 55 to be projected through the coagulant cloud where the latex and coagulant are thoroughly mixed and then deposited upon the surface of the article. When coating of the article has been completed, the trigger lever is released which closes first the latex valve, then the coagulant valve, and finally the air valve so that no latex can possibly be deposited upon the article without first being treated with coagulant.

The fluid coagulant utilized in this invention may be any fluid capable of coagulating or otherwise materially altering the flowing properties of the rubber latex or analogous aqueous dispersion under the conditions of operation hereinabove described and which itself is not injurious to the material to be coated. The fluid coagulant for example may be a coagulating gas such as carbon dioxide, a highly volatile liquid coagulant such as alcohol or acetone, a less volatile liquid such as formic or acetic acid solution, or even a mineral acid solution such as a solution of hydrochloric or sulfuric acid although such acids generally are not desirable because of their greater corrosive action, or the coagulant may be a solution of a coagulating salt in a suitable liquid vehicle, for example, a solution of a salt of a polyvalent metal such as zinc nitrate, calcium chloride, barium chloride, calcium acetate, calcium nitrate, etc., in a suitable solvent which may be water or a more volatile solvent such as acetone or alcohol.

More specifically, in coating fabrics such as the satin hereinabove mentioned and like textile materials which are easily spotted and discolored, a coagulant solution containing 15 grams of barium chloride per 100 cc. of water has been found to be exceptionally satisfactory as regards absence of spotting and discoloration as well as the production of a coagulated rubber coating of the desired properties. The proportion of barium chloride may be varied from about 10 grams per 100 cc. up to the limit of its solubility in water which is about 40 grams per 100 cc. In coating kid and similar leathers a coagulant consisting of about 10 cc. of glacial acetic acid per 100 cc. of water has been found satisfactory.

As has been indicated, the "latex" employed in this invention may be any natural or artificial aqueous dispersion of rubber, including caoutchouc, balata, gutta percha, synthetic rubber and like materials, or any analogous coagulable dispersion of other material having suitable properties, such as a wax dispersion, and such dispersions may be concentrated, diluted, thickened, thinned, vulcanized or unvulcanized as desired, and may contain any desirable compounding materials.

Numerous modifications and variations may be made in details of the invention as hereinabove described without departing from the scope of the discovery as indicated by the appended claims.

I claim:

1. In an apparatus for applying a readily removable coating of latex to an article such as a shoe part, means for producing a cloud of atomized fluid coagulant and means initially operable only after initial production of the cloud for projecting through said cloud and onto said article latex in finely divided form.

2. In an apparatus for applying a coating of latex to an article, means for producing a cloud of atomizer fluid coagulant, means for projecting through said cloud and onto said article latex in finely divided form, and means controlling the aforesaid two means for positively insuring maintenance of the coagulant cloud at all times the latex projection means is in operation.

3. In an apparatus for applying a coating of latex to an article, means for producing a cloud of atomized fluid coagulant, means for projecting through the cloud produced and onto said article latex in finely divided form, means for controlling the starting and stopping of the cloud producing means, and means operable only after initial production of the cloud for controlling the starting and stopping of the latex projection means.

4. In an apparatus for applying a coating of latex to an article, means for producing a cloud of atomized fluid coagulant, means for projecting through the cloud produced and onto said article latex in finely divided form, means for controlling the starting and stopping of the cloud production, means for controlling the starting and stopping of the latex projection, and means for successively operating the two controlling means, whereby the latex projecting means is operable only when the cloud producing means is in operation.

5. In that method of manufacturing an article, such as a shoe, embodying material likely to be damaged during manufacture in which a protective latex coating is applied to an exposed surface of said material, the process of applying said latex coating which comprises spraying liquid latex in fine droplets through an appreciable space toward and onto the surface of the material and treating the latex droplets during their travel toward the surface of the material with a latex coagulant, whereby the sprayed latex droplets are surface treated with latex coagulant before they are deposited on the surface of the material and produce thereon a coherent film readily stripped from the material when desired to expose the protected surface of the material.

6. Apparatus for applying a coating of coagulated latex to an article, comprising, in combination, means for spraying latex coagulant, means for spraying latex and means for atomizing the two sprays, said coagulant spraying means being arranged with respect to the latex spraying means in such manner as to cause the coagulant spray and the latex spray to commingle at an intermediate point in the line of travel of the sprays, and a single means for controlling starting and stopping of the aforesaid two sprays in such manner that the latex spraying means is not operated except while the coagulant spraying means is in operation.

7. The method of applying a readily strippable temporary protective coating of latex rubber to an object having an easily damaged surface, which comprises directing a latex sprayer toward the object without starting the latex spray, spraying latex coagulant to produce a cloud of coagulant between the latex sprayer and the object, promptly thereafter starting the latex spray and spraying latex through the coagulant cloud and onto the object until a desired coating has been produced thereon, then stopping the latex spray and promptly thereafter stopping the coagulant spray, whereby no latex which has not been first treated with coagulant is deposited upon the object to be coated.

8. The method of applying a coating of latex rubber to a surface which comprises the steps, performed in positively controlled sequence in the order recited, of producing and maintaining a cloud of atomized fluid coagulant contiguous to said surface, projecting liquid rubber latex in finely divided form through said cloud and onto the surface to form thereon a coating of at least partially coagulated latex, stopping projection of the latex, and also stopping production and maintenance of the coagulant cloud at a time not earlier than the stopping of the latex projection, whereby no latex which has not been first treated with coagulant is deposited upon the surface.

9. In a tool or apparatus for applying a coating which comprises different liquid constituents, the combination with a plurality of body portions, each having a discharge nozzle and means for admitting a motive agent and a different one of the liquid constituents of the coating for discharge through the nozzle, said body portions, including the nozzles, being disposed angularly to each other so that the discharged constituents coalesce, of a single means for starting the discharging operation of the nozzles in a predetermined successive order.

10. Two spray guns, one supported from the other, each having a spray nozzle and an independent source of material supply therefor, both of said nozzles being in communication with a common source of motive agent supply, and a single means for starting the spraying operation of the nozzles in a predetermined successive order.

11. Two spray guns, one supported from the other, each having a spray nozzle and an independent source of material supply therefor, both of said nozzles being in communication with a common source of motive agent supply, and a single means for starting the spraying operation of the nozzles in a predetermined successive order and for stopping said spraying operation in a successive order reverse to that of the first named order.

MERRILL E. HANSEN.

CERTIFICATE OF CORRECTION.

Patent No. 2,249,205.                                                        July 15, 1941.

MERRILL E. HANSEN.

It is hereby certified that error appears in the printed specification of the above numbered patent requiring correction as follows: Page 2, second column, line 51, for "pressure" read --pressures--; page 4, first column, line 45, claim 2, for "atomizer" read --atomized--; line 50, same claim, for "projection" read --projecting--; line 57, claim 3, for "producing means" read --production--; line 60, same claim, strike out "means"; line 61, claim 4, before "coating" insert --readily removable--; line 62, same claim, after "article" and before the comma insert --such as a shoe part--; and that the said Letters Patent should be read with this correction therein that the same may conform to the record of the case in the Patent Office.

Signed and sealed this 29th day of September, A. D. 1942.

(Seal)                                          Henry Van Arsdale,
                                              Acting Commissioner of Patents.